(12) United States Patent
Matsumoto

(10) Patent No.: US 8,056,244 B2
(45) Date of Patent: Nov. 15, 2011

(54) ELECTRIC SAW

(75) Inventor: Hiroshi Matsumoto, Hikone (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 285 days.

(21) Appl. No.: 12/382,884

(22) Filed: Mar. 26, 2009

(65) Prior Publication Data

US 2010/0000095 A1 Jan. 7, 2010

(30) Foreign Application Priority Data

Jul. 7, 2008 (JP) ................................. 2008-177105

(51) Int. Cl.
*B27B 9/00* (2006.01)
(52) U.S. Cl. ............................................ 30/391; 30/124
(58) Field of Classification Search .................... 30/124, 30/390, 391, 388, 389
See application file for complete search history.

(56) References Cited

U.S. PATENT DOCUMENTS

| | | | | |
|---|---|---|---|---|
| 3,034,493 | A * | 5/1962 | Bandy | 125/13.01 |
| 3,123,111 | A * | 3/1964 | Mattson | 30/390 |
| 4,450,627 | A | 5/1984 | Morimoto | |
| 4,675,999 | A * | 6/1987 | Ito et al. | 30/124 |
| 5,675,895 | A | 10/1997 | Mori et al. | |
| 5,822,864 | A * | 10/1998 | Campbell et al. | 30/123 |
| 6,108,912 | A * | 8/2000 | Radigan | 30/124 |
| 6,167,626 | B1 | 1/2001 | Doumani et al. | |
| 7,526,866 | B2 * | 5/2009 | Schnell et al. | 30/124 |
| 7,562,456 | B2 * | 7/2009 | Roehm et al. | 30/390 |
| 7,908,951 | B2 * | 3/2011 | Bohne et al. | 83/100 |

FOREIGN PATENT DOCUMENTS

| | | |
|---|---|---|
| DE | 1 794 669 | 8/1959 |
| EP | 0 810 071 | 9/1998 |
| JP | U62-053108 | 4/1987 |
| JP | U62-114704 | 7/1987 |
| JP | 05-004201 | 1/1993 |
| JP | 05-31701 | 2/1993 |
| JP | 06-335904 | 12/1994 |
| JP | 2000-006101 | 1/2000 |
| JP | U3117796 | 12/2005 |
| JP | 2008-001033 | 1/2008 |
| WO | 03/103883 | 12/2003 |

* cited by examiner

*Primary Examiner* — Hwei C Payer
(74) *Attorney, Agent, or Firm* — Bacon & Thomas, PLLC

(57) ABSTRACT

In an electric saw includes a circular saw blade, a guard cover is arranged to surround an upper portion of the circular saw blade and a dust collecting case is arranged at the rear of the guard cover for collecting chips generated during a cutting operation performed by the circular saw blade. An openable lid unit is arranged in a position along a passage through which the chips pass. The guard cover is formed into a curved shape along the circular saw blade and the passage is defined by the guard cover to extend along a peripheral edge of the circular saw blade. The lid unit includes an opening portion formed in the passage and a lid member for closing the opening portion. The lid unit is opened toward the front of the guard cover as the lid member is rotated along a rotating plane of the circular saw blade.

3 Claims, 8 Drawing Sheets

ELECTRIC SAW

FIELD OF THE INVENTION

The present invention relates to an electric saw provided with a dust collecting case for containing chips generated in a cutting process.

BACKGROUND OF THE INVENTION

Typically, an electric saw is provided with a guard cover surrounding the upper portion of a circular saw blade. In most cases, a dust collecting case is arranged either on the side of the guard cover or at the rear thereof.

With the configuration in which the dust collecting case is arranged on the side of the guard cover, not only is it easy to increase the size of the dust collecting case but also it is possible to realize a high recovery rate of chips using the upward chip-hurling force exerted by the tips of teeth of the rotating circular saw blade. However, the dust collecting case becomes an obstacle in a cutting work, thereby reducing the workability. Another problem is that the dust collecting case makes it difficult to observe the cutting spot. In view of this, JP5-31701A discloses a configuration in which a dust collecting case is made transparent, with its frontal lower portion cut away, in an effort to increase the visibility of a cutting spot. However, this configuration fails to avoid the reduction in workability caused by the dust collecting case arranged on the side of a guard cover.

On the other hand, the configuration with which the dust collecting case is arranged at the rear of the guard cover provides advantages in that it is compact, easy to perform a task while allowing a user to readily observe the cutting spot of an electric saw. However, this configuration increases the distance between the cutting spot and the dust collecting case, which in turn reduces the recovery rate of chips. Another drawback is that the passage of the dust collecting case tends to be filled with chips.

Taking this into account, Japanese Patent Laid-open Publication No. 6-335904 discloses a configuration with which a pipe is inserted through a guard cover from the front portion of the latter. The tip end of the pipe is arranged adjacent to a cutting spot, thus forming a passage through which to introduce chips into a dust collecting case. In other words, with this rear arrangement type construction, the chips drawn into the guard cover are collected in the dust collecting case by use of the air stream generated within the guard cover during rotation of a circular saw blade. In addition to the air stream, the upward chip-hurling force exerted by the tips of teeth of the circular saw blade may be used in this construction. As a result, it is possible to further increase the recovery rate of chips.

However, if the passage through which the chips are delivered to the dust collecting case becomes longer, the interior of the passage tends to be full of the chips. Although it becomes possible to use the upward chip-hurling force by arranging the tip end of the passage adjacent to the cutting spot, this reduces the air stream introduced into the passage. As a result, the passage has an increased tendency to be clogged by the chips. It is the conventional practice that, when the passage is clogged, the cutting work is stopped for a while to dismantle and clean the electric saw. This poses a problem in that the dismantling and cleaning operation is onerous and highly time-consuming. During the cleaning operation, care should be taken in terms of safety, e.g., not to touch the circular saw blade. This also leaves a room for improvement.

SUMMARY OF THE INVENTION

In view of the afore-mentioned problem, the present invention provides an electric saw that enables a user to eliminate chip clogging in an easy and safe manner.

In accordance with an aspect of the present invention, there is provided an electric saw including: a circular saw blade rotationally driven by a motor; a guard cover arranged to surround an upper portion of the circular saw blade; a dust collecting case arranged at the rear of the guard cover for collecting chips generated during a cutting operation performed by the circular saw blade; and an openable lid unit arranged in a position along a passage through which the chips pass.

The guard cover may be formed into a curved shape along the circular saw blade, the passage being defined by the guard cover to extend along a peripheral edge of the circular saw blade, the lid unit including an opening portion formed in a position along the passage and a lid member for closing the opening portion, the lid unit being opened toward the front of the guard cover as the lid member is rotated along a rotating plane of the circular saw blade.

The electric saw may further include a restraint unit for restraining rotation of the lid member to limit the opening degree of the lid unit.

The electric saw may further include a holding portion provided at one side of the guard cover and gripped by a user, the restraint unit being provided in the holding portion so as to make contact with the lid member during rotation of the lid member.

The electric saw may further include a biasing unit for biasing the lid member in such a direction as to bring the lid unit into a closed state.

The electric saw may further include a switch turned on to permit energization of the motor when the lid unit is in a closed state.

With the present invention, it is possible to provide an electric saw that enables a user to eliminate chip clogging in an easy and safe manner.

BRIEF DESCRIPTION OF THE DRAWINGS

The objects and features of the present invention will become apparent from the following description of preferred embodiments, given in conjunction with the accompanying drawings, in which.

DETAILED DESCRIPTION OF THE PREFERRED EMBODIMENTS

Figure 1:
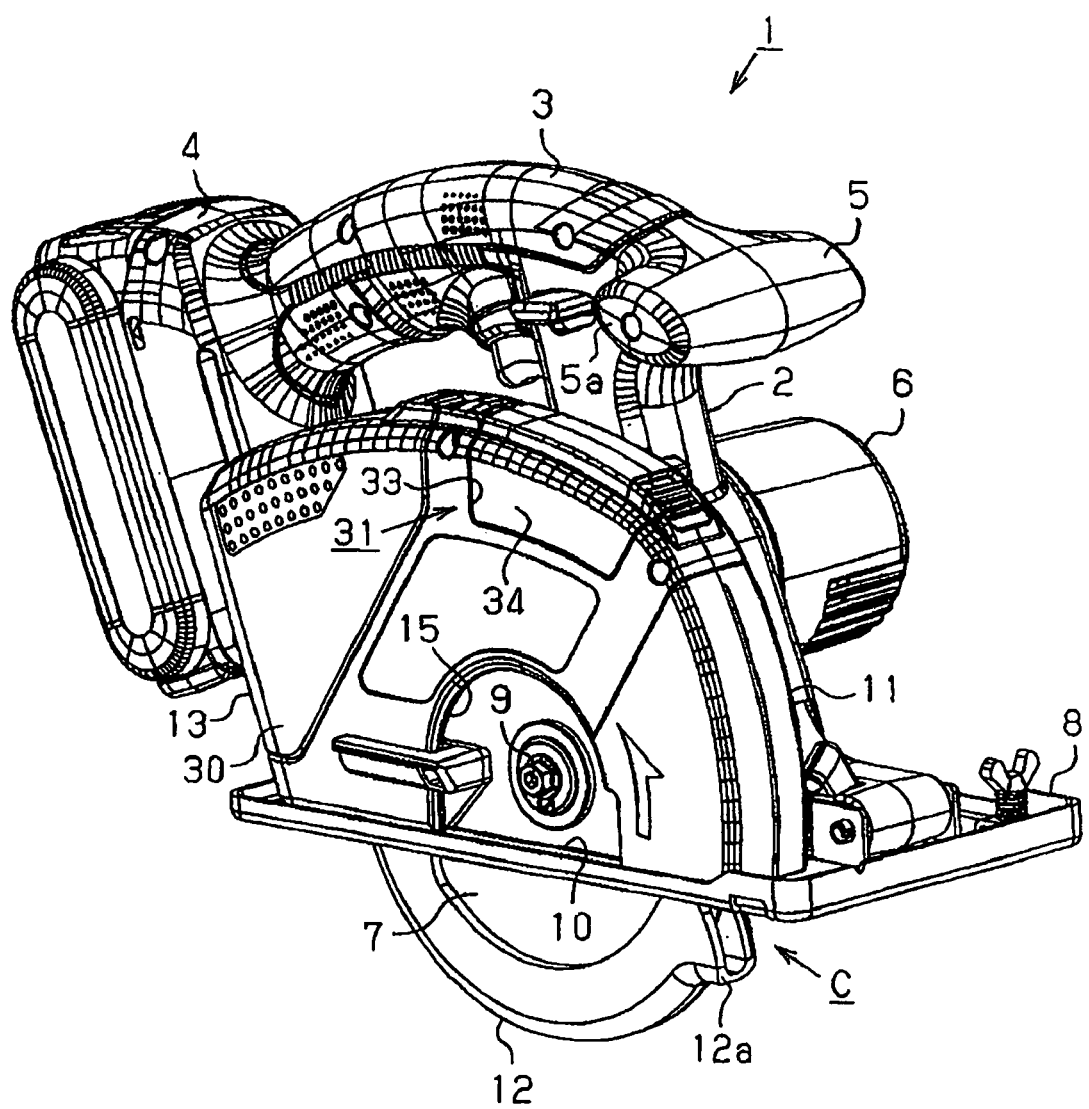
FIG. 1 is a perspective view showing an electric saw in accordance with the present invention.

Hereinafter, one embodiment of the present invention will be described with reference to the accompanying drawings which form a part hereof.

Referring to FIGS. 1 through 4, the electric saw 1 of the present embodiment includes a main body 2, a curved rod-shaped holding portion 3 extending from the main body 2 in the back-and-forth direction and a power supply portion 4 arranged at the rear end of the holding portion 3 to accommodate a battery (not shown) therein. In the present embodiment, a handle 5 for enabling a user to perform other tasks is formed at the tip end of the holding portion 3. A motor 6 as a driving power source is operatively connected to the circular saw blade 7 via a speed reducer (not shown) provided inside the main body 2. The motor 6 and the circular saw blade 7 are arranged on the opposite sides of the main body 2 in such a fashion that the main body 2 is interposed between them.

More specifically, a rotation shaft 9 extending from the speed reducer protrudes at one side of the main body 2 and a flat base 8 is installed below the main body 2. The circular saw blade 7 is coupled to the rotation shaft 9 and is arranged so that the rotational plane thereof can be substantially parallel to the main body 2, with a portion thereof protruding downwards through an opening 10 formed in the base 8.

The circular saw blade 7 has teeth formed along the peripheral edge thereof. The tip ends of the teeth and the opposite side surfaces of the circular saw blade 7 are surrounded by upper and lower covers 11 and 12 serving as guard covers. At the rear side of the upper cover 11 that surrounds the upper portion of the circular saw blade 7, there is provided a dust collecting case 13 for collecting chips generated during a cutting operation performed by the circular saw blade 7.

In the present embodiment, the upper cover 11 has a thickness in the axial direction of the rotation shaft 9 and is formed into a generally flat box-like shape. The upper cover 11 has an opening portion 14 formed in the lower end thereof. In the present embodiment, a generally semicircular opening portion 15 is formed on one side surface of the upper cover 11 near the rotation shaft 9. The upper cover 11 and the circular saw blade 7 are supported as a unit by the main body 2 so that the upper cover 11 can accommodate and surround the upper portion of the circular saw blade 7, more precisely the portion of the circular saw blade 7 lying above the base 8.

The lower cover 12 has a U-shaped cross section and is formed into an arc shape along the peripheral edge of the circular saw blade 7. Just like the upper cover 11, the lower cover 12 and the circular saw blade 7 are supported as a unit by the main body 2 so that the lower cover 12 can surround the tip ends of teeth of the circular saw blade 7 positioned below the base 8.

In the present embodiment, the tip ends of teeth of the circular saw blade 7 are not covered by the lower cover 12 at the front lower side of the base 8. The region where the tip ends of teeth of the circular saw blade 7 are exposed becomes a cutting spot C at which a workpiece is cut by the circular saw blade 7.

A user of the electric saw 1 of the present embodiment grips the holding portion 3 (and the handle 5) and determines the position of the electric saw 1 so that the cutting spot C can make contact with a workpiece. Then the circular saw blade 7 is rotated by operating a switch (not shown) of the main body 2. In this state, the user advances the circular saw blade 7 to cut the workpiece.

In the electric saw configured as above, it is a common idea that the workpiece is arranged below the circular saw blade 7. The side at which the circular saw blade 7 makes contact with the workpiece is regarded as a front side. In case of the electric saw 1 of the present embodiment, therefore, the right side in FIG. 2 will be referred as "front side", the left side as "rear side", the lower side as "lower side" and the upper side as "upper side".

The lower cover 12 of the present embodiment is installed so that it can rotate about the rotation shaft 9, in response to which the rear end 12b of the lower cover 12 can be retracted into the upper cover 11. The lower cover 12 is biased by a resilient member (not shown) so as to rotate in a direction in which the tip end 12a of the lower cover 12 moves forwards (i.e., counterclockwise in FIG. 3). This ensures that, during the cutting operation, the tip end 12a of the lower cover 12 comes into contact with the workpiece arranged at the cutting spot C. Based on the retraction amount of the lower cover 12 into the upper cover 11 when the lower cover 12 is pressed and rotated by the workpiece, it is possible to learn the cutting depth of the workpiece.

A discharge portion 21 through which to discharge the chips generated during the cutting operation to the outside of the upper cover 11 is formed in the rear peripheral edge portion of the upper cover 11. The dust collecting case 13 of the present embodiment is united with the upper cover 11 in such a manner as to surround the vicinity of the discharge portion 21.

More specifically, the upper cover 11 of the present embodiment has a front peripheral edge portion curved to conform to the outer circumference of the circular saw blade 7 accommodated therein. Within the upper cover 11, there is provided a partition wall 22 similarly curved to conform to the outer circumference of the circular saw blade 7. The interior of the upper cover 11 is radially divided by the partition wall 22. In the present embodiment, the outer side of the partition wall 22 forms a passage 23 communicating with the discharge portion 21.

The discharge portion 21 of the present embodiment includes a tubular portion 25 formed on the outer side of the partition wall 22 to extend along the extension line of the passage 23. The dust collecting case 13 includes a case member 30 formed independently of the upper cover 11 and removably attached to the rear peripheral edge portion of the upper cover 11 so as to surround the tubular portion 25.

Figure 2:
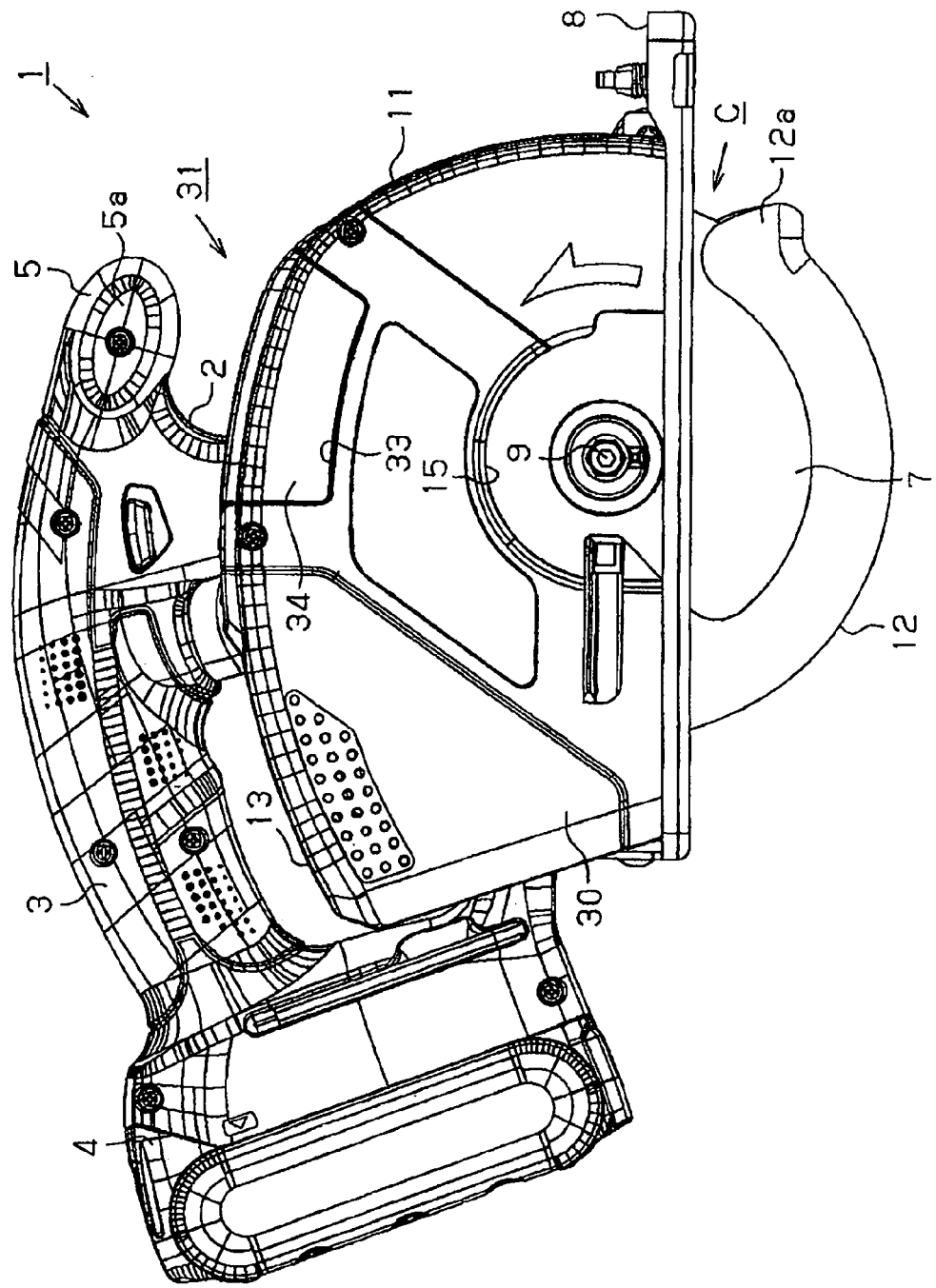
FIG. 2 is a side view of the electric saw.
Figure 3:
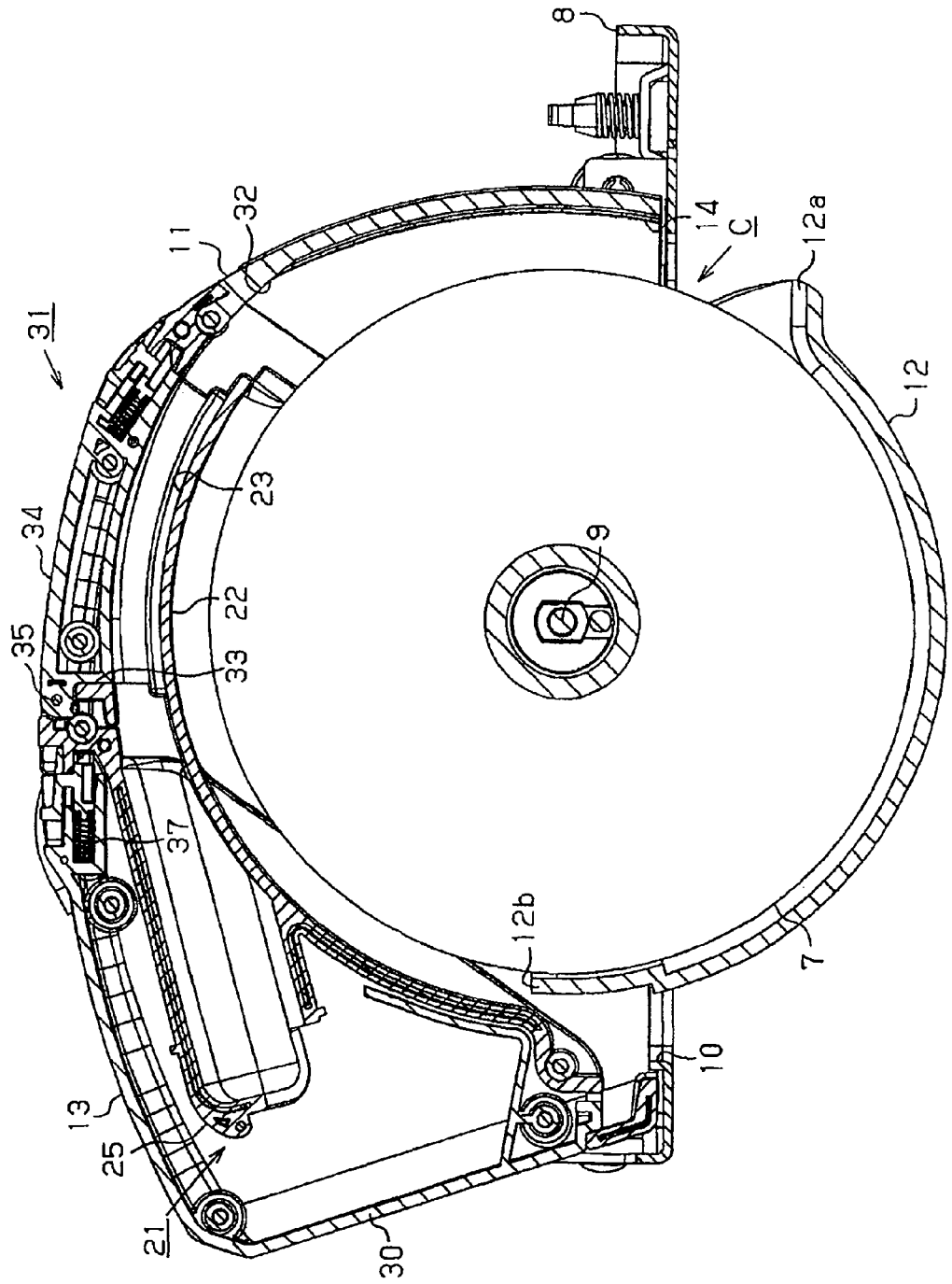
FIG. 3 is a section view of the electric saw taken along a rotating plane of a circular saw blade.
Figure 4:
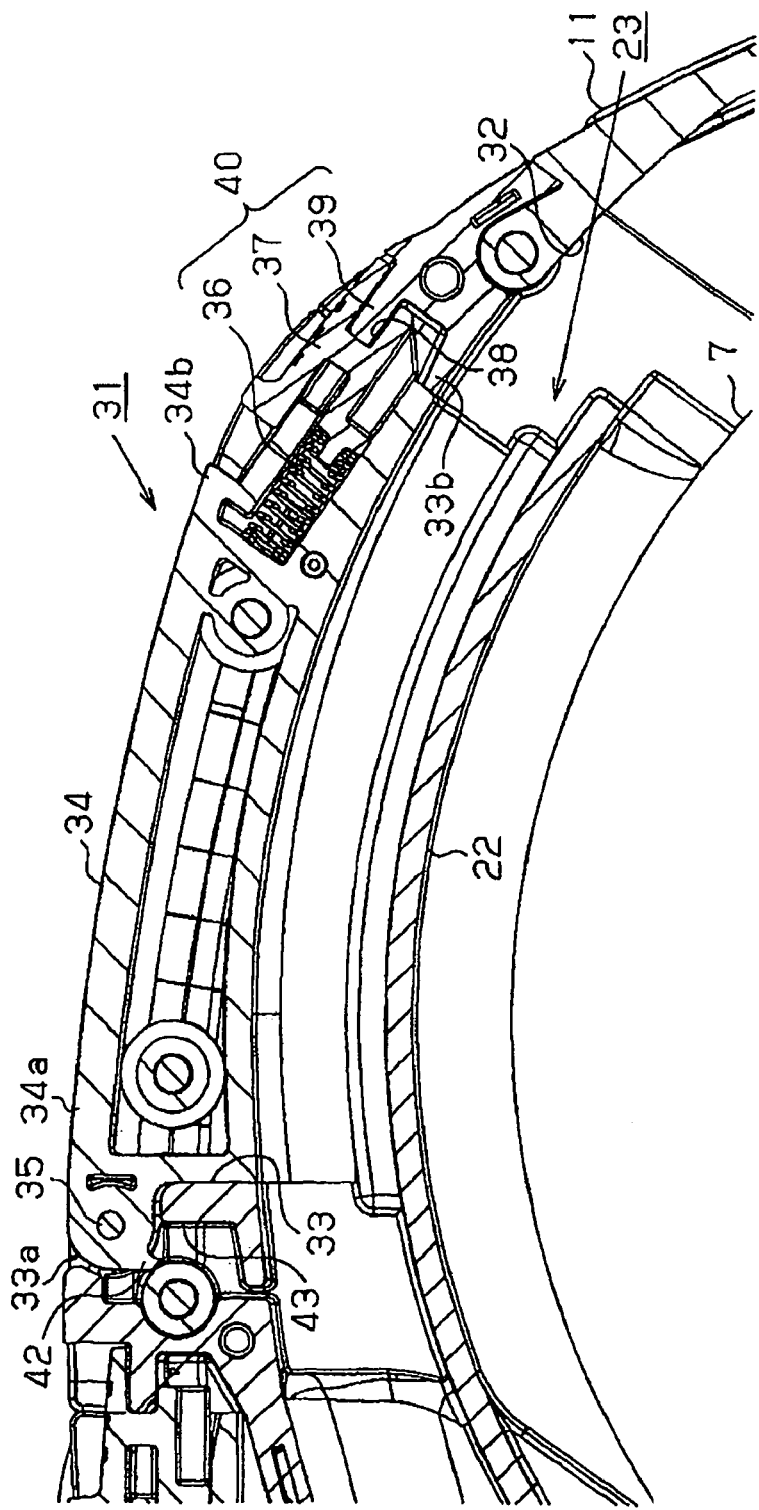
FIG. 4 is an enlarged section view showing a lid unit and its vicinity.

In the present embodiment, as the motor is driven, the circular saw blade 7 is rotated counterclockwise in FIG. 3 (namely, in a direction indicated by an arrow marked on one side surface of the upper cover 11 in FIG. 2). Thus an air stream flowing in the rotational direction of the circular saw blade 7 is generated within the upper cover 11. The chips created during the cutting operation are sucked into the upper cover 11 under the action of this air stream and are moved through the passage 23 of the upper cover 11. Then the chips are discharged from the discharge portion 21 into the dust collecting case 13 provided at the rear of the upper cover 11. Therefore, it is important to effectively use the air stream generated by the rotation of the circular saw blade 7.

Since the interior of the upper cover 11 is radially divided by the partition wall 22 as set forth above, the air stream generated by the rotation of the circular saw blade 7 can be led to the radial outer side of the partition wall 22, i.e., the passage 23, without being weakened. This makes it possible to increase the recovery rate of chips.

In the present embodiment, a lid unit 31 is installed somewhere along the passage 23. When chip clogging occurs within the passage 23, the lid unit 31 can be opened to eliminate the chip clogging.

More specifically, as shown in FIGS. 3 through 6, an opening portion 33 extending along the circumferential direction of the upper cover 11 is formed in the peripheral edge portion of the upper cover 11 that forms an outer circumferential wall 32 of the passage 23. The lid unit 31 of the present embodiment includes the opening portion 33 and a lid member 34 capable of closing the opening portion 33.

In the present embodiment, a pivot shaft 35 extending parallel to the axis of the rotation shaft 9 is provided near the rear open end 33a of the opening portion 33. The lid member 34 has a base end 34a supported on the pivot shaft 35 for rotation about the pivot shaft 35. The lid unit 31 of the present invention can be opened toward the front side of the upper cover 11 as the lid member 34 is rotated along the rotating plane of the circular saw blade 7.

The lid member 34 is provided at its tip end 34b with an engagement member 37. The engagement member 37 is biased by a coil spring 36 in such a direction as to protrude forwards. At the front open end 33b of the opening portion 33, there is provided a projection portion 39 that can engage with a recess portion 38 formed at the tip end of the engagement member 37. In the present embodiment, a lock mechanism 40 for locking the tip end 34b of the lid member 34 against the front open end 33b of the opening portion 33 includes the engagement member 37 (the recess portion 38) provided in the lid member 34, the projection portion 39 as an engaged portion formed in the opening portion 33 and the coil spring 36 as a biasing means.

The lid unit 31 of the present invention comes into a closed state if the lid member 34 is rotated to close the opening portion 33, while causing the engagement member 37 to engage with the projection portion 39 of the opening portion 33. The lid unit 31 is configured to come into an open state if the engagement member 37 and the projection portion 39 are disengaged from each other against the biasing force of the coil spring 36 and if the lid member 34 is rotated to lift up the tip end 34b thereof.

Figure 5:
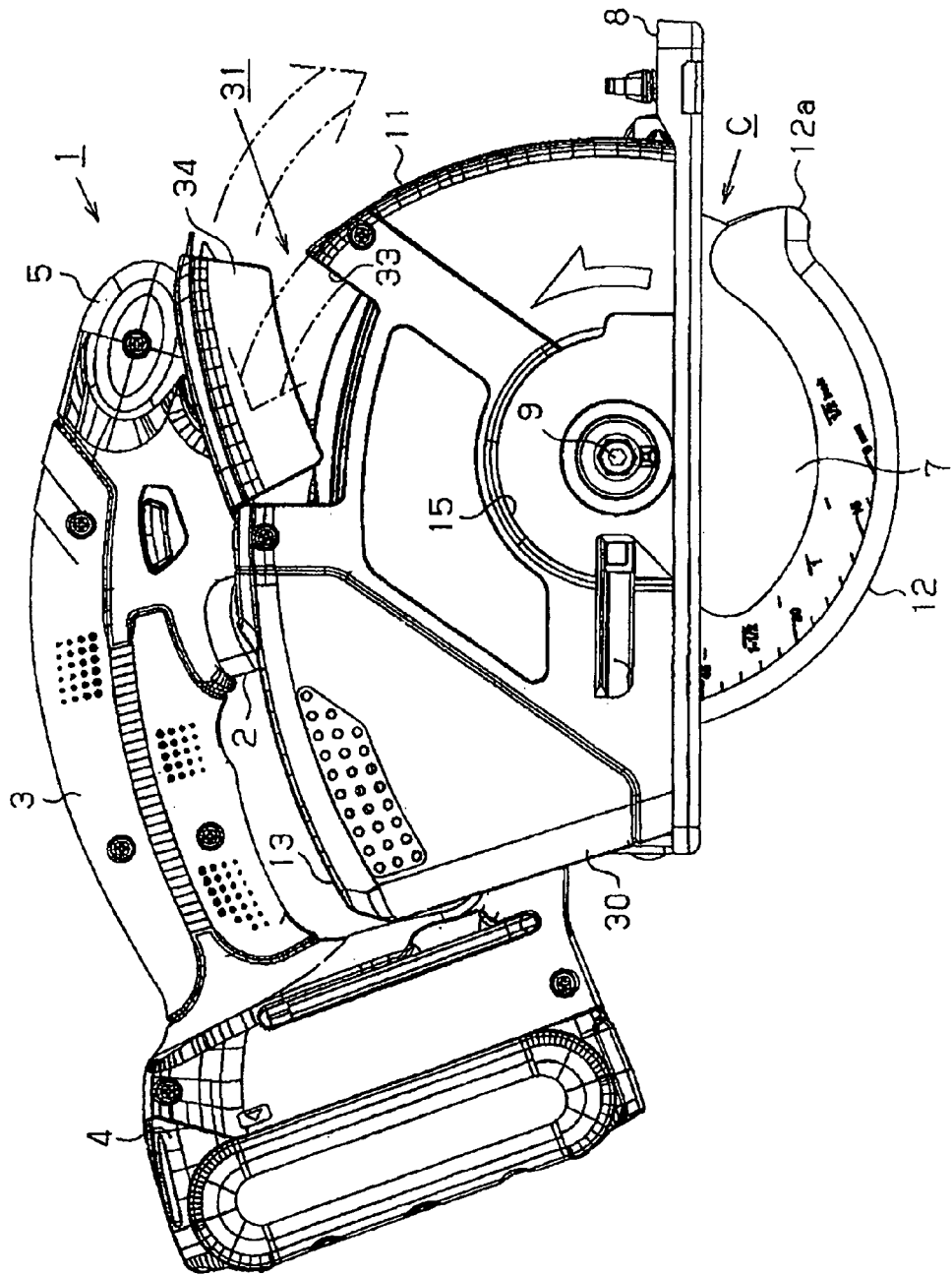
FIG. 5 is a side view of the electric saw with the lid unit kept in an open state.
Figure 6:
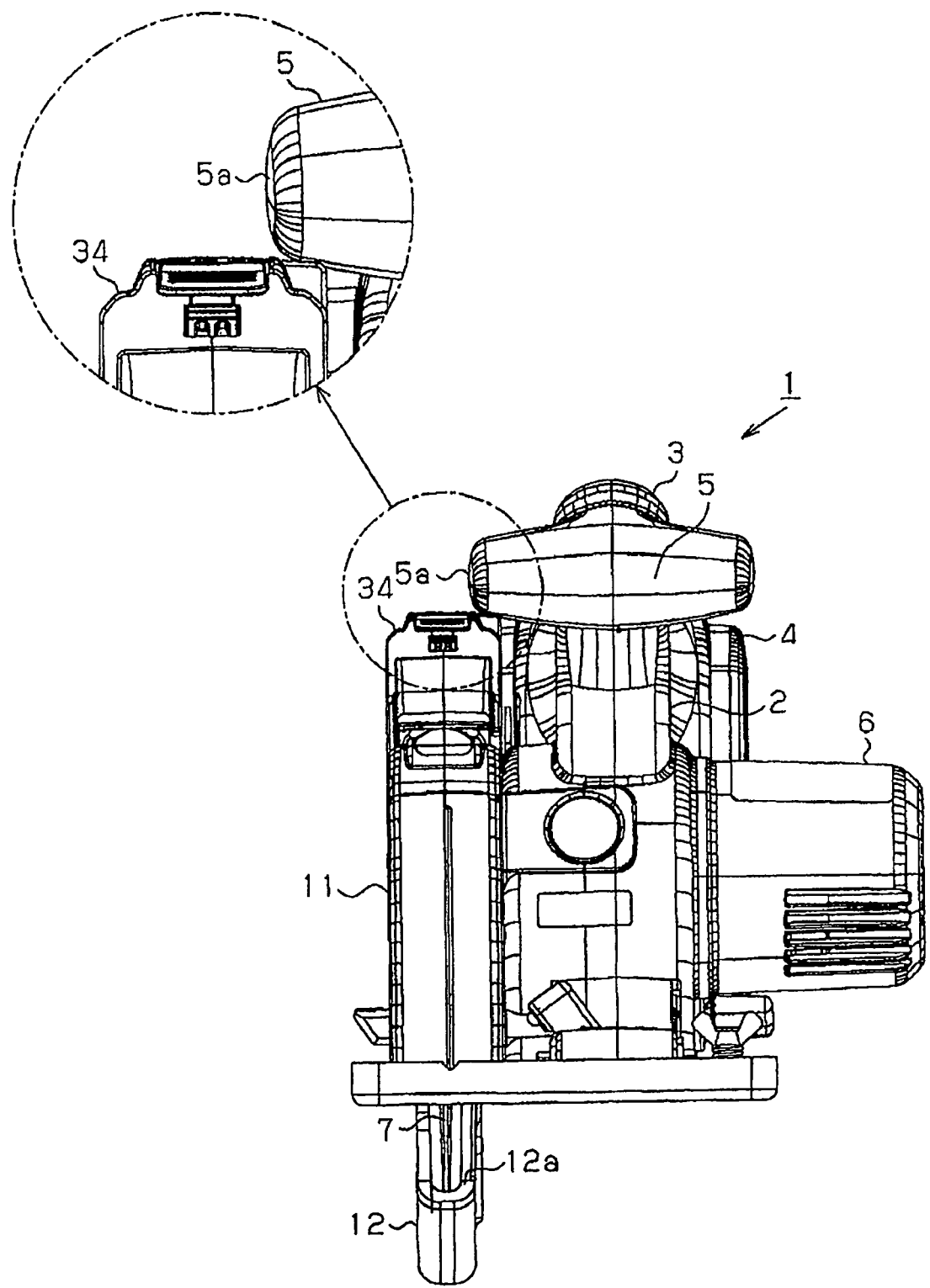
FIG. 6 is a front view of the electric saw with the lid unit kept in an open state.

In the present embodiment, as shown in FIGS. 5 and 6, the handle 5 provided at the tip end of the holding portion 3 has a generally rod-like shape and extends in the direction substantially perpendicular to the rotating plane of the circular saw blade 7. The handle 5 has a tip end 5a extending to above the upper cover 11. As the lid member 34 is rotated as above, the tip end 5a of the handle 5 makes contact with the lid member 34, thereby restraining the rotation of the lid member 34 and limiting the opening degree of the lid unit 31.

Figure 7:
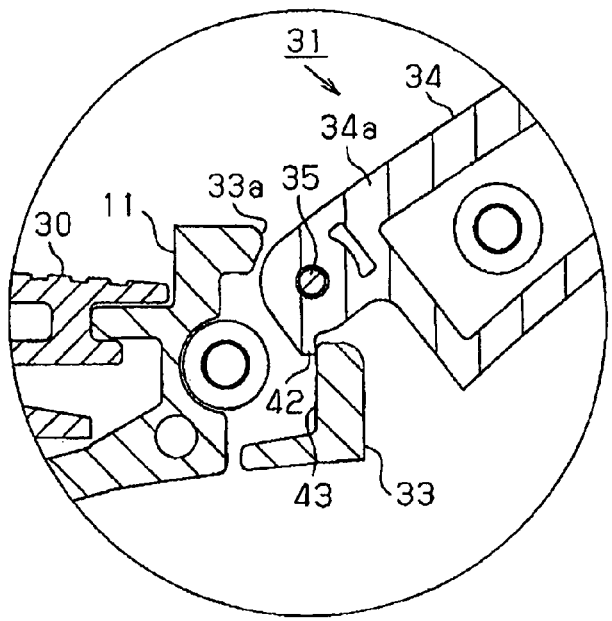
FIG. 7 is an enlarged section view showing the base end portion of the lid unit.

In the present embodiment, as shown in FIG. 7, the lid member 34 has a stopper lug 42 formed at the base end 34a thereof. At the rear open end 33a of the opening portion 33, there is formed a stopper wall 43 that makes contact with the stopper lug 42 moved by the rotation of the lid member 34, thus restraining the movement of the stopper lug 42 and restraining the rotation of the lid member 34. This provides a configuration capable of restraining the rotation of the lid member 34 and limiting the opening degree of the lid unit 31 in the same manner as the lid member 34 makes contact with the handle 5 (i.e., the tip end 5a of the handle 5).

With the present embodiment described above, it is possible to obtain the operation and effect as follows.

(1) By providing the lid unit 31 along the passage 23, the chip clogging that may possibly occur within the passage 23 can be easily and rapidly eliminated without having to dismantle the electric saw 1, e.g., without no removal of the upper cover 11. As a result, it is possible to prevent accidents, e.g., the user's careless touching the circular saw blade 7, which may possibly take place when the electric saw 1 is otherwise dismantled and cleaned. This helps enhance safety in using the electric saw 1.

(2) The passage 23 communicating with the discharge portion 21 is formed on the outer side of the partition wall 22 by radially dividing the interior of the upper cover 11 with the partition wall 22 formed into a curved shape along the outer circumference of the circular saw blade 7. Furthermore, the opening portion 33 extending along the circumferential direction of the upper cover 11 is formed in the peripheral edge portion of the upper cover 11 that forms the outer peripheral wall 32 of the passage 23. In addition, the lid unit 31 is provided in the passage 23 by allowing the lid member 34 as a movable member to close the opening portion 33.

With this configuration, the passage 23 and the lid unit 31 can be formed with the upper cover 11 as a unit. This makes the electric saw 1 compact, while allowing the lid unit 31 to be opened and closed with ease.

(3) The lid unit 31 can be opened forwards of the upper cover 11 by rotating the lid member 34 along the rotating plane of the circular saw blade 7.

In other words, if the user starts a cutting operation with the lid unit 31 kept opened, there is a possibility that the chips may be escaped from the lid unit 31. With the configuration mentioned above, however, the chips escaped backwards from the opening portion 33 is blocked by the lid member 34 and therefore is ejected forwards, i.e., to the front side of the opening portion 33 (see FIG. 5). Therefore, even if the electric saw 1 is used without closing the lid unit 31, it is possible to prevent an accident in which the chips escaped from the opening portion 33 hit against the user. This makes it possible to assure enhanced safety.

(4) With the present embodiment, there is provided the restraint unit capable of restraining the rotation of the lid member 34 and eventually limiting the opening degree of lid unit 31. Therefore, it is possible to prevent the lid member 34 from staying in a rotated state and to prevent a user from using the electric saw 1 with the lid unit 31 left opened. This makes it possible to assure enhanced safety.

(5) The tip end 5a of the handle 5 is configured to extend to above the upper cover 11 so that it can make contact with the lid member 34 during rotation of the latter.

With this configuration, it is possible to restrain the rotation of the lid member 34 and to limit the opening degree of the lid unit 31 using a simplified structure. This makes it possible to have the handle 5 serve as a protection member. Specifically, if the electric saw 1 falls down with the lid unit 31 kept in an open state (for example, if the electric saw 1 is inadvertently tumbled in a cleaning process), the lid member 34 remaining in an open state may possibly be damaged by the impact exerted at that time. With the configuration noted above, however, it is possible for the handle 5 to protect the lid member 34, thus avoiding damage of the lid member 34. This makes it possible to avoid a situation in which the lid member 34 is left opened.

The present embodiment may be modified as follows.

In the present embodiment, the opening portion 33 of the lid unit 31 is closed by the lid member 34 rotatable about the pivot shaft 35. However, the present invention is not limited thereto. As an alternative example, the lid unit 31 may employ a slide-type lid member that can slide over the opening portion 33 to open and close the same.

In the present embodiment, the rotation of the lid member 34 is restrained by bringing the tip end 5a of the handle 5 into contact with the lid member 34 and by allowing the stopper lug 42 of the base end 34a of the lid member 34 to make contact with the stopper wall 43. However, the present invention is not limited thereto. As an alternative example, the rotation of the lid member 34 may be restrained by either the contact between the handle 5 and the lid member 34 or the contact between the stopper lug 42 and the stopper wall 43. As a further alternative example, the rotation of the lid member 34 may be restrained by other restraint means, e.g., by allowing a portion other than the handle 5 to make contact with the lid member 34.

It may also be possible to employ a means for making sure that the lid unit 31 is in a closed state. In this case, the motor for rotating the circular saw blade 7 may be driven only when the closed state of the lid unit 31 is confirmed. For example, the lid unit 31 may be provided with a switch that will be turned on to permit energization of the motor 6 when the lid unit 31 is in a closed state. This configuration eliminates the possibility that the circular saw blade 7 is rotationally driven while the lid unit 31 is in an open state. Accordingly, it is possible to realize enhanced safety.

Figure 8:
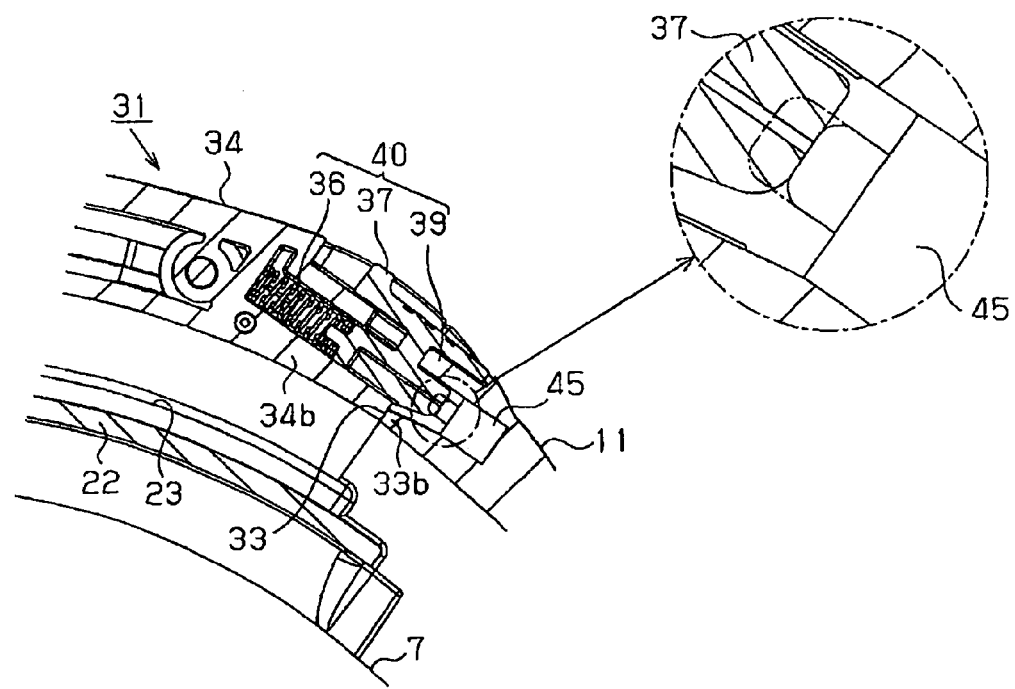
FIG. 8 is an enlarged section view showing another example of the tip end portion of the lid unit.

More specifically, as shown in FIG. 8, a switch 45 that can be pressed and turned on by the engagement member 37 engaging with the projection portion 39 is provided in the front open end 33b of the opening portion 33. Indicated by a double-dotted chain line in FIG. 8 is the position of the switch 45 when the switch 45 is not pressed by the engagement member 37, namely when the lid unit 31 is in an open state. With this configuration, energization of the motor 6 is permitted only when the switch 45 is turned on.

In addition, it may be possible to provide a biasing means (e.g., a spring) for biasing the lid member 34 in such a direction as to bring the lid unit 31 into a closed state. This prevents the lid unit 31 from staying in an open state, which assists in further enhancing safety.

Figure 9A:
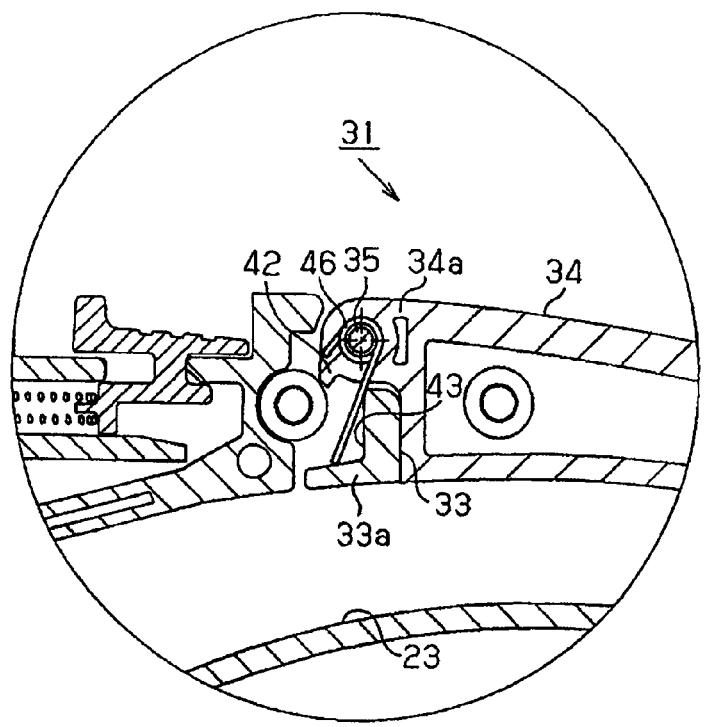
FIGS. 9A and 9B are enlarged section views showing another example of the base end portion of the lid unit.
Figure 9B:
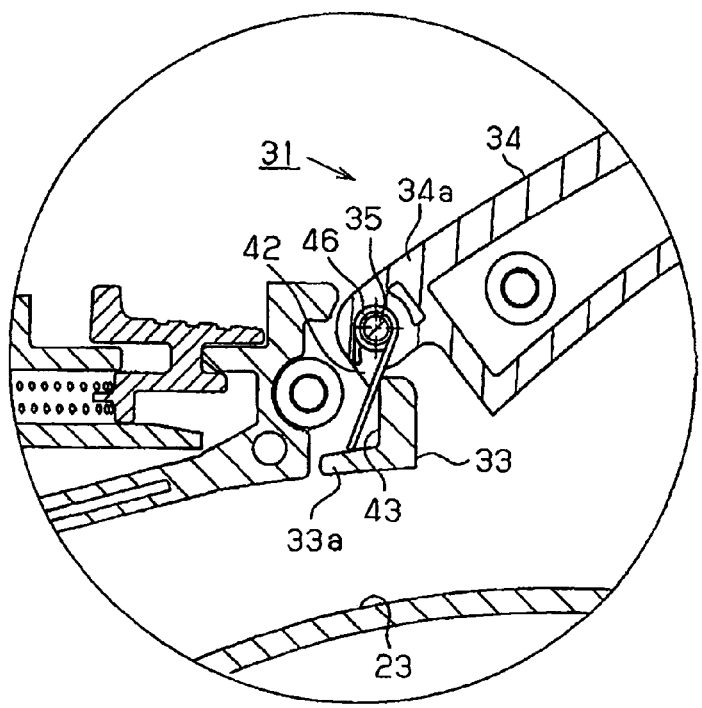

More specifically, as shown in FIGS. 9A and 9B, a torsion coil spring 46 is loosely fitted to the pivot shaft 35. One end of the torsion coil spring 46 is retained in the base end 34a of the lid member 34, while the other end is retained in the rear open end 33a of the opening portion 33. The torsion coil spring 46 is arranged so that it can come into a compressed state when the lid unit 31 is in an open state (see FIG. 9B) rather than when in a closed state (see FIG. 9A). With this configuration, the lid member 34 is biased by the torsion coil spring 46 in such a direction as to bring the lid unit 31 into the closed state.

While the invention has been shown and described with respect to the preferred embodiments, it will be understood by those skilled in the art that various changes and modification may be made without departing from the scope of the invention as defined in the following claims.

What is claimed is:

1. An electric saw comprising:
a circular saw blade rotationally driven by a motor;
a guard cover arranged to surround an upper portion of the circular saw blade;
a dust collecting case arranged at the rear of the guard cover for collecting chips generated during a cutting operation performed by the circular saw blade; and
an openable lid unit arranged in a position along a passage through which the chips pass,
wherein the guard cover is formed into a curved shape along the circular saw blade, the passage being defined by the guard cover to extend along a peripheral edge of the circular saw blade, the lid unit including an opening portion formed in a position along the passage and a lid member for closing the opening portion, the lid unit being opened toward the front of the guard cover as the lid member is rotated along a rotating plane of the circular saw blade, and
wherein the electric saw further comprises:
a restraint unit for restraining rotation of the lid member to limit the opening degree of the lid unit; and
a holding portion provided at one side of the guard cover and gripped by a user, the restraint unit being provided in the holding portion so as to make contact with the lid member during rotation of the lid member.

2. The electric saw of claim 1, further comprising a biasing unit for biasing the lid member in such a direction as to bring the lid unit into a closed state.

3. The electric saw of claim 1, further comprising a switch turned on to permit energization of the motor when the lid unit is in a closed state.

* * * * *